(12) United States Patent
Goldstein et al.

(10) Patent No.: US 11,533,194 B2
(45) Date of Patent: Dec. 20, 2022

(54) SECURITY AND ENVIRONMENTAL CONTROL BASED ON VIRTUAL REALITY HEADSET USAGE

(71) Applicant: Crackle, Inc., Culver City, CA (US)

(72) Inventors: Aaron Goldstein, Los Angeles, CA (US); Christine Coner, Los Angeles, CA (US); Ihor Yaskiw, Santa Monica, CA (US)

(73) Assignee: CRACKLE, INC., Culver City, CA (US)

( * ) Notice: Subject to any disclaimer, the term of this patent is extended or adjusted under 35 U.S.C. 154(b) by 0 days.

(21) Appl. No.: 16/876,240

(22) Filed: May 18, 2020

(65) Prior Publication Data
US 2020/0280459 A1 Sep. 3, 2020

Related U.S. Application Data

(62) Division of application No. 15/452,903, filed on Mar. 8, 2017, now Pat. No. 10,693,672.

(51) Int. Cl.
*H04L 12/28* (2006.01)
(52) U.S. Cl.
CPC ........ *H04L 12/2829* (2013.01); *H04L 12/282* (2013.01); *H04L 12/2832* (2013.01)
(58) Field of Classification Search
CPC ............... H04L 12/2829; H04L 12/282; H04L 12/2832
See application file for complete search history.

(56) References Cited

U.S. PATENT DOCUMENTS 8,965,460 B1 2/2015 Rao
9,142,242 B1 * 9/2015 Peters ...................... G11B 7/00
(Continued)

FOREIGN PATENT DOCUMENTS

CN 205124072 U 3/2016
CN 105897520 A 8/2016
(Continued)

OTHER PUBLICATIONS

Duo Xu, et al., "Wearable Technology & Human Behavior In Smart Home Appliances", published May 2015.

*Primary Examiner* — Sm A Rahman
(74) *Attorney, Agent, or Firm* — Mayer & Williams, PC; Stuart Mayer

(57) ABSTRACT

Systems and methods described provide and add significant functionality to virtual and augmented reality display systems. For example, when a user is "immersed" in a virtual reality environment, certain home environmental parameters may be changed, or may change state, and efforts at energy conservation can be automatically or semi-automatically initiated, at least temporarily, while the user is in the virtual reality environment. This allows the user to reduce energy consumption in their home while they are immersed in the virtual reality world by automatically turning down output to lights and other devices that the user does not need while in the headset. Users are further provided with the benefit of notifications during their virtual reality experience, bridging the gap of separation from the outside world with regard to security by allowing users to remain "in" a virtual reality environment while they are still alerted of important activity in their surroundings.

7 Claims, 3 Drawing Sheets

(56) References Cited

U.S. PATENT DOCUMENTS

| | | | |
|---|---|---|---|
| 9,465,392 B2 * | 10/2016 | Bradley | F24F 11/30 |
| 9,672,707 B2 * | 6/2017 | Kerzner | G08B 13/19682 |
| 9,762,851 B1 | 9/2017 | Baumert | |
| 10,139,906 B1 * | 11/2018 | Bai | G06F 3/014 |
| 2011/0246125 A1 | 10/2011 | Shkolnikov | |
| 2013/0245796 A1 | 9/2013 | Lentzitzky et al. | |
| 2014/0171039 A1 | 6/2014 | Bjontegard | |
| 2014/0280316 A1 * | 9/2014 | Ganick | G06F 16/2457 707/769 |
| 2015/0104771 A1 | 4/2015 | Bernstein | |
| 2016/0274762 A1 * | 9/2016 | Lopez | G06F 3/0488 |
| 2017/0095157 A1 * | 4/2017 | Tzvieli | A61B 5/6814 |
| 2017/0173262 A1 * | 6/2017 | Veltz | A61B 5/0022 |
| 2018/0130260 A1 | 5/2018 | Schmirler | |
| 2018/0248972 A1 * | 8/2018 | Ahuja | H04L 12/2829 |

FOREIGN PATENT DOCUMENTS

| | | | | |
|---|---|---|---|---|
| CN | 105912988 A | * | 8/2016 | G06K 9/00 |
| CN | 106468949 A | | 3/2017 | |

\* cited by examiner

SECURITY AND ENVIRONMENTAL CONTROL BASED ON VIRTUAL REALITY HEADSET USAGE

FIELD

The invention relates to virtual reality devices and interactions with external devices and sensors.

BACKGROUND

Virtual reality devices have gone from being the ambit of only highly-expensive military and scientific hardware to that of a relatively inexpensive consumer electronics device. The overall field of virtual reality includes both true virtual reality (VR) in which a headset fills the entire view of a user, and also augmented reality in which the user or viewer employs see-through lenses to embellish or augment a real-life scene with computer-generated imagery.

Particularly in the case of true virtual reality (termed herein just virtual reality or "VR"), a user feels considerable immersion in a scene. A problem is that the user is unaware of goings-on in their environment, and the sense of immersion can be undesirably lessened by worries about their environment, including questions of security, safety, and the like. In a worst-case scenario, the user may be unaware if a fire alarm or an intruder alarm is going off. Certain systems allow "camera mode", where external surroundings may be viewed, but such is a reactive solution, and does not allow proactive action to be taken.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to present principles meet the needs of the above in several ways. In one implementation, systems and methods bridge the gap of separation from the outside world with regard to security by allowing users to remain "in" a virtual reality environment while they are still alerted of important activity in their surroundings.

In addition, systems and methods according to present principles provide other significant functionality. For example, when a user is "immersed" in a VR environment, certain home environmental parameters may be changed, or may change state, and thus efforts at energy conservation can be automatically or semi-automatically initiated, at least temporarily, while the user is in the VR environment. This allows the user to reduce energy consumption in their home while they are immersed in the VR world by automatically turning down output to lights and other devices that the user does not need while in the headset.

In a first aspect, the invention is directed towards a method of providing a notification to a user of a display in which user awareness of their environment is reduced, including: a. receiving a first signal at a hub computing environment indicating that a display is being used by a user, the display being one in which user awareness of a surrounding environment is reduced, the display driven by a display computing environment, the hub computing environment being coupled to at least one initiator device; and b. in response to the received first signal, determining if a notification should be delivered to the display, the determination based at least in part on the initiator device and on the user profile.

Implementations of the invention may include one or more of the following. The display may be integral with the display computing environment. The initiator device may include a computing environment in which messages are received, and the user profile may indicate whether messages from a set of predetermined users result in notifications of the respective messages to be delivered to the display. The method may further include receiving a signal from a network source that a user equipment has joined a network associated with the hub computing environment, and determining if a signal should be delivered to the display based on an identity of a user associated with the user equipment and further based on the user profile. The network source may be a WiFi router. The initiator device may include mental sensor. The environmental sensor may be selected from the group consisting of: a camera, a microphone or audio or voice recognition sensor, a haptic/touch sensor, a telephone/communication device, a motion sensor, a door/window sensor, or a combination of the above. The initiator device may include an alarm system. The display may be a head mounted display, such as a virtual reality headset. The head mounted display may alternatively be an augmented reality headset.

In another aspect, the invention is directed towards a non-transitory computer readable medium, including instructions for causing a computing environment to perform the above method.

In yet another aspect, the invention is directed towards a method of controlling a parameter of an environment, the environment one in which a display is employed by a user, the display such that user awareness of the environment is reduced, including: a. receiving a first signal at a hub computing environment indicating that a display is being used by a user, the display one in which user awareness of their environment is reduced, the display driven by a display computing environment, the hub computing environment coupled to at least one environmental control device; and b. in response to the received first signal, transmitting a second signal to the at least one environmental control device to cause a change to a parameter of the environment.

Implementations of the invention may include one or more of the following. The environment control device may be a thermostat, and the transmitting a second signal may include transmitting a signal to lower a set temperature on the thermostat. The environment control device may be a light controller, and the transmitting a second signal may include transmitting a signal to lower a lighting level on the light controller. The environment control device may be a device controller, and the transmitting a second signal may include transmitting a signal to the device controller to cause an associated device to be placed into a sleep or low power mode. A combination of a category of the received first signal and a category of the transmitted second signal may form a portion of an entry in a user profile. The category of the first signal may be display usage and the category of the second signal may be selected from the group consisting of: lighting, temperature, CE device, and combinations thereof. The method may further include detecting whether another user is present in the environment, and the transmitted second signal may be further dependent on the result of the detecting. The method may further include detecting whether another user is participating in an application running on the display computing environment, and the transmitted second signal may be further dependent on the result of the detecting. In another aspect, the invention is directed towards a non-transitory computer readable medium, including instructions for causing a computing environment to perform the above method.

Advantages of the invention may include, in certain embodiments, one or more of the following. Systems and methods according to present principles provide a greater feeling of security to the user, and thus increase the VR sense of immersion. In this way, the user is less likely to have to pause or stop VR applications to check their outside surroundings, and thus the overall computing environment running the VR application and potentially the home automation hub computing environment operates more efficiently. Systems and methods disclosed also provide for energy conservation measures to be automatically undertaken, increasing energy efficiency, both in terms of overall energy conservation and also with regard to specific computing environments that may be affected, e.g., by being placed in a sleep state. Thus, systems and methods provide significant technological advantages: smoother and more efficient operation of a VR system, automatic instantiation of notification applications and subsequent delivery of notifications, and the tuning of environmental parameters leading to energy conservation. Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Like reference numerals refer to like elements throughout. Elements are not to scale unless otherwise noted.

DETAILED DESCRIPTION

Systems and methods according to present principles generally use VR activity detection as an input to a home automation system, also termed a hub computing environment, or as inputs to separate systems that perform home automation functionality. In addition, signals from home automation systems or elsewhere, e.g., other computing environments, may be used as inputs to a VR system, providing notifications on a VR user interface (UI), generally termed here a "display". In so doing, detection of VR activity can lead to a change of state of the home automation center (e.g., a 'VR mode'). As a particular example, when commencing a VR session, VR integration software may synchronize with (or be part of) software operating a home automation system or hub computing environment. In addition, while the term "display" is employed here, and in many cases employed to refer to a VR head mounted display, it will be understood that such may include any type of display in which user awareness of their environment is significantly restricted, decreased, lessened, hampered, or eliminated entirely, including augmented reality (AR) headsets, including Google Glass®, Microsoft Hololens®, and so on.

Figure 1C:
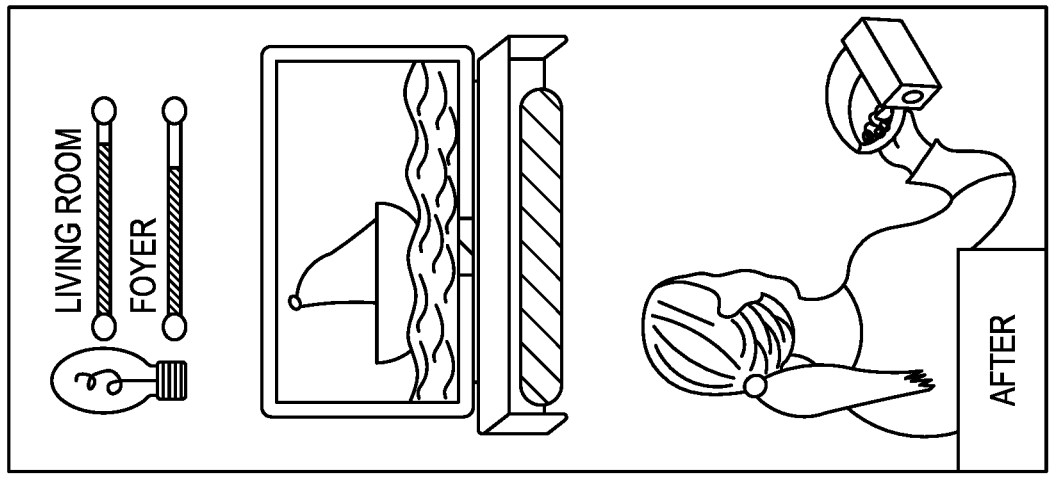
FIGS. 1A-1C show an environment in which systems and methods according to present principles may be implemented and operated.
Figure 1B:
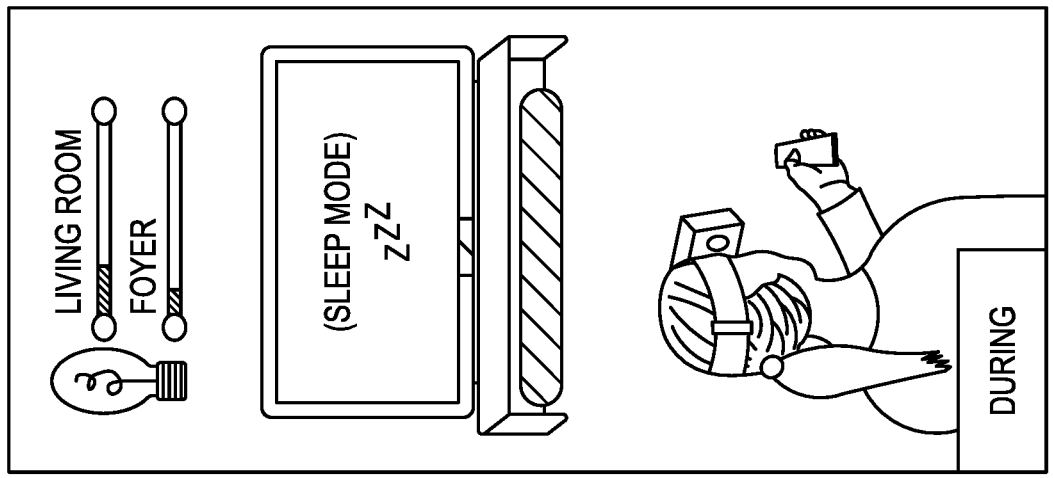
Figure 1A:
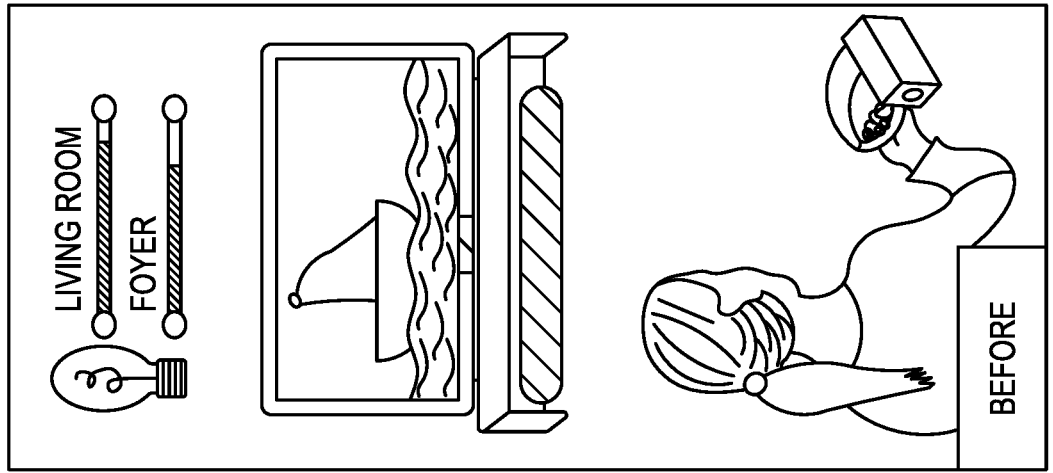

Referring first to FIGS. 1A-1C, it may be seen that before a user dons a VR headset, generally termed a display and controlled by a display computing environment (which can in some instances be integral with the display), environmental settings on a home automation system may lead to certain parameters being set for, e.g., a living room and a foyer. In addition, a television may have a certain setting, e.g., such that the picture is "on" (FIG. 1A). During the VR session, shown in FIG. 1B, the TV may be automatically set to a "sleep mode" (which is generally already configured in some way in the television or other CE device, and which functionality can be conveniently leveraged by present systems by an appropriate signal being sent to activate the state), and parameters for the living room and foyer automatically turned down. Such parameters may include temperature settings, lighting settings, and so on. Following the VR session, shown in FIG. 1C, the parameters may be automatically returned to those shown in FIG. 1A. It will be understood that the term "automatically" may include some level of user control in some implementations, at least to the extent of a user setting up a user profile or accepting a default user profile.

Figure 2:
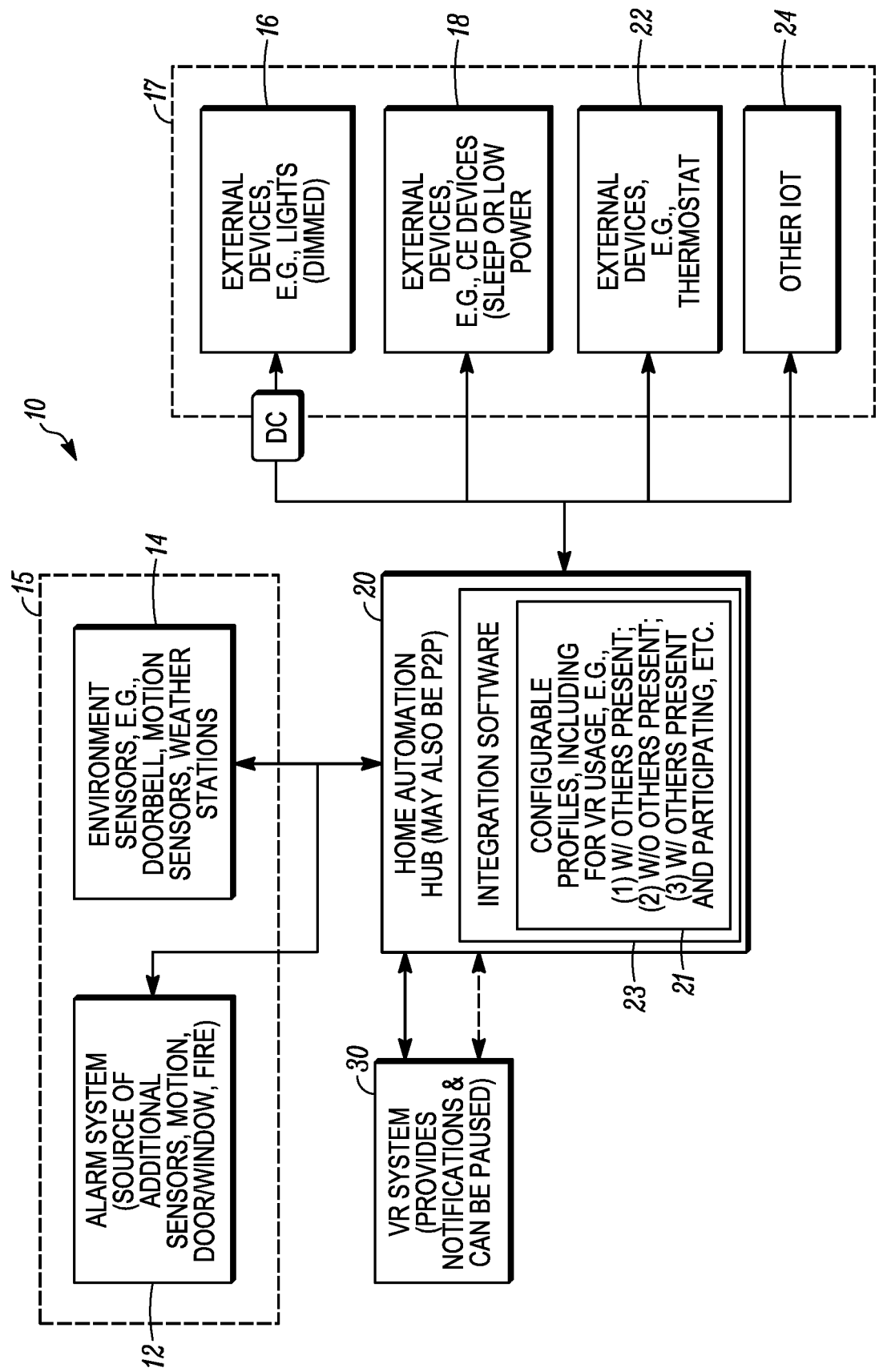
FIG. 2 is an exemplary schematic diagram illustrating components of an exemplary system according to present principles.

FIG. 2 shows an exemplary arrangement 10 in which systems and methods according to present principles may be embodied. A home automation hub computing environment 20 is illustrated in connection with a VR system 30. The home automation hub may be, e.g., similar to the Logitech Harmony Hub® system which operates using the Android® operating system. The software within the home automation hub 20 may include or may be made to include integration software 23, which allows communications with the VR system 30, which in turn includes a display and a display computing environment. The integration software may be implemented in a number of ways. The same may be provided by a separate software module operating on the hardware of the home automation hub, e.g., running on a separate processor or running on a separate thread of a common multi-threaded processor. Alternatively, the integration software may be implemented as a submodule within the home automation hub software. In yet another implementation, the integration software may run on a separate device in communication with a home automation hub. For example, the integration software may run on a PC that is in communications with the home automation hub. Other implementations will also be understood.

Within the integration software 23 may be configured a number of profiles 21, including those contemplating VR usage. For example, a profile may be for sole VR usage with no one else in the house. Another profile may be for sole VR usage with others present in the house but not participating in the activity or application running on the VR. Yet another profile may contemplate others present in the house and participating in the application running on the VR. In this case, where one is participating in the VR but not within a headset, one may be viewing an aspect of the VR experience or seen on a television screen.

The VR system 30 may be of various types, including wired systems, wireless systems, and so on. In many cases such VR systems will include an accelerometer and other sensors, as well as a camera for detecting and quantifying movement, and as well as a display for viewing and potential input devices. On the display of the VR system may be provided notifications, and the same may be controlled by the home automation hub 20. The notifications may also be provided by a device that receives messages or notifications and transmits the same through to the VR display. The display is generally connected to a display computing environment, although in some cases the display may be integral (e.g., for Samsung Gear VR®, Daydream VR®).

A number of initiator devices 15, which are often sensors, may be seen connected to the home automation hub 20, including those from an alarm system 12, which may include door and window sensors, fire alarms, motion sensors, doorbell camera and sensor systems, and so on. Various other environment sensors 14 may be used, which may overlap with certain sensors within the alarm system 12. For example, doorbell camera systems (not associated with an alarm system) may be connected to the hub, along with weather stations, motion sensors, and so on. External (but connected) computing environments may also be employed as initiator devices, which may receive and relay messages to the hub, resulting in potential notifications on the display.

A number of external devices 17 may serve as systems to be controlled, in some cases through an appropriate device controller, if the system cannot be directly controlled by the hub. For example, a number of external devices 16 such as lights may be controlled, e.g., the output of the hub may be a signal sent to a device controller to control the intensity of a lamp, thus positively impacting power conservation. Other external devices 18 include those that can be put in sleep or low-power modes, e.g., televisions, other consumer electronic devices, and so on. Other external devices 22 include thermostats, which can control the temperature of an environment, a house, or a room. Still other external devices 24 include other "Internet of things" (IOT) devices, which in some cases may serve as both initiator devices and device controllers. It will be understood that device controllers are not absolutely necessary, if the hub computing environment is configured to directly attach to a given appliance, e.g., thermostat, light switch, and so on.

Figure 3:
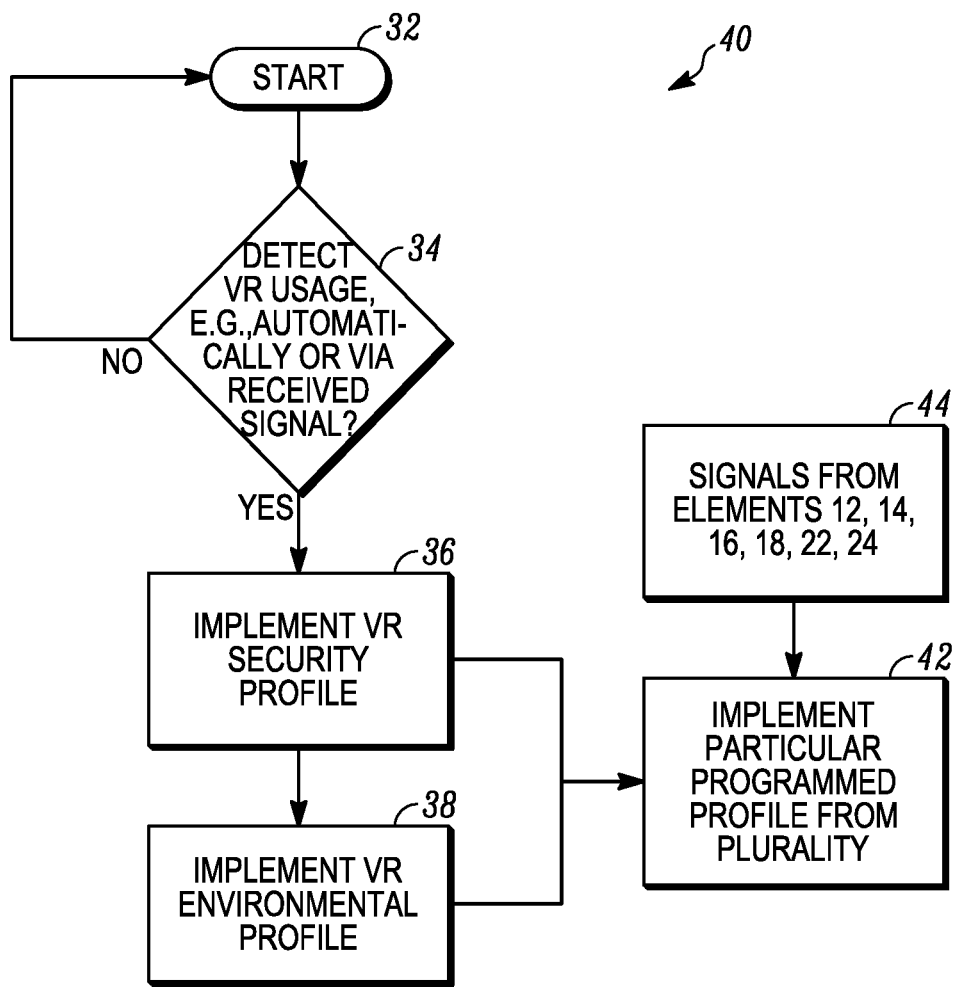
FIG. 3 is a flowchart of a method according to present principles.

FIG. 3 illustrates an exemplary flowchart 40 of a method according to present principles. In this method, after a start step 32, VR usage may be determined to be detected, e.g., either automatically or via a received signal from the VR system 30 (step 34). If no VR usage is determined to be present, then the system may go back to the start step (step 32). If however, VR usage is determined, then a VR security profile may be implemented (step 36), as well as a VR environmental profile (step 38). In implementing such profiles, a particular programmed profile may be implemented from a plurality of programmed profiles (step 42). The particular profile selected, chosen, or automatically determined may be controlled by signals from the elements of FIG. 2, e.g., elements 12, 14, 16, 18, 22, and 24 (step 44).

VR usage may be determined to be detected in step 34 in a number of ways. In a first implementation, VR usage may be affirmatively detected by receipt of a signal from the VR system 30 to the VR integration software. Such a signal may be sent automatically or manually by a user. Where the same is sent automatically, the signal may be sent upon detection that the user has donned an HMD, e.g., by detection of a characteristic accelerometer signal associated with the act of putting on the headset, or upon, e.g., starting a VR session, experience, application, or scene, that results in a signal or signals being transmitted for rendering on the display, whether or not it has been affirmatively determined that the headset has been donned by the user.

Implementing a VR security profile generally includes determining if one or more notifications should be delivered to the display, the determining involving consideration of the source of a potential notification, e.g., the identity of the initiator device, as well as potentially a user profile. For example, a user profile may indicate that it is desired to receive notification upon a spouse returning to the home environment. If a spouse then subsequently enters the home, as indicated by an initiator device, then the notification is provided. The initiator device may be, e.g., a network device, indicating spousal access to a local network or, e.g., RFID detection of the spouse's car key. When a door sensor is used as an initiator device, but where the identity of the entrant cannot be ascertained, then the notification may be transmitted and display but the same may indicate "entrant unknown".

Implementing a VR environmental profile generally includes, in response to a first received signal indicating VR usage, transmitting a second signal to affect a parameter of the environment, often through an environmental control device, also termed a device controller. For example, in response to a signal indicating VR usage, the second signal may be employed to turn down one or more programmed lights, to turn down a thermostat, and perform other functionality affecting the environment.

Details of exemplary VR security and environmental profiles are disclosed below. It will be understood that it need not be a separate step to set each of these types of profiles. A single set up procedure may be implemented to allow the setup of both at the same time. Conversely, various other types of profiles may also be provided and set up. A default set up profile may be provided, with commonly-performed functionality pre-programmed, e.g., placing the TV in "sleep" mode when a VR experience is occurring, and then the user may simply make variations to these default parameter values. In addition, the "profile" aspect may be transparent to the user; the user may simply configure the system such that when VR is used, the lights and thermostat are turned down and other devices, especially devices with screens, are placed in sleep mode (or other such reduced power mode).

In addressing issues of user-perceived security during VR use, notifications may be provided, delivered to the display that are controllable and configurable by a user profile and/or user preferences, e.g., a security profile. The controlling and configuring may include providing filtering functionality, such that only notifications from predetermined and/or pre-entered users are delivered to the headset. The profile may further configure that certain VR applications have different allowances for notifications. For example, VR games may have limited notifications, while VR internet browsing experiences allow greater presence of notifications.

Such notifications may be of received messages but are generally based on environmental occurrences and happenings, as determined by initiator devices such as door sensors, doorbell sensors, fire alarm, alarm systems, network devices, and so on. Exemplary notifications are shown in Table I.

TABLE I

| Signal from initiator device | Event or occurrence | Filter (from Profile) | Resulting Notification on Display |
|---|---|---|---|
| Doorbell ring | Visitor at door | Notify on all | "Visitor at Door (doorbell chime)" |
| Door opened | Entry into environment | Notify on all | "Door opened" |
| WiFi indicates device joined- (device is roommate's) | UE just joined network | Notify on all except roommate | (nothing) |
| Fire alarm sounds | Potential smoke or fire | Notify on all | "Fire Alarm!" |
| Message arrives | Message arrives from spouse | Disallow all except spouse, alternatively Notify on spouse only | "Message from Spouse arrived" |
| Door opened- (car key signature detected to be roommate's) | Roommate entered environment | Notify on all unless known to be roommate. | (nothing) |

Specific types of notifications may include, e.g., a small pop-up window, an audio notification, as well as an automatic pausing of the VR application. The size may depend on the severity, which again can be controlled by a user profile. For example, a fire alarm may have a far more prominent notification as compared to a notification that a roommate is home. In any case, once cleared, the VR application may be unpaused.

Upon ceasing the VR experience, e.g., by a signal sent by the VR apparatus to the home automation hub, or by passive detection of a null level of VR user activity (by detection of no signal being rendered on the display, or no accelerometer activity in the headset or control device), security and environmental settings may revert to one or more of the following: a default set of parameter settings, a set of parameters existing prior to the VR session or experience, or those designated for post-VR or non-VR use in a user profile.

Several technical benefits may be associated with systems and methods according to present principles. For example, a significant savings of energy may result based on the automatic powering down. For CE devices that are powered down, such may enjoy significant lifespan extensions. Users may be notified of security issues in a particularly rapid manner. Users may enjoy their VR experiences much more, at a much greater level of immersion, as security concerns will be effectively assuaged. In other words, a user feels more in control and so can enjoy the overall experience more.

Variations will now be described.

In some VR systems, multiple users may have multiple respective profiles associated with the VR display computing environment. Such multiple profiles may indicate different desires for security notifications and for environmental adjustments. In these cases, the choice, indication, or selection of a particular profile may occur at the time the user logs into their profile, or alternatively may be detected by detecting a particular characteristic accelerometer "signature" associated with the user, i.e., how they don the headset, how they use it, the pattern of motions they usually or typically perform, and so on.

Notifications have been described, as well as environmental parameter changes. In some cases, both may occur. For example, if during a VR session of a user another person enters the room or environment, this may result in a notification and it may also result in a change of environment settings. In some implementations a VR session is a joint VR experience, where one user is in VR and another is not in VR, or the experience may be such that non-VR users can watch on a television screen what is being rendered on the VR display; in this case there may be no setting changes to the overall regular operation of the home automation system, and in some implementations all notifications may be disallowed or never instantiated, as it may be expected that the non-VR user could respond to (or at least be aware of) any security events. Of course, such aspects can all be individually set by the user.

In an implementation, communications with the display computing environment, the hub computing environment, the initiator device(s), and the optional device controller(s) may be wired, wireless, e.g., WiFi, Bluetooth®, or cellular, combinations of these, or other such communications types.

User profiles generally include (but are not limited to) data allowing a home automation system (or a notification system) to be controlled in a certain way, for a given user, given a certain set of input data (which may be present via the initiator devices), leading to a desired output for environmental control and delivery of notifications, and including where multiple settings and combinations of settings may be programmed at once.

In an example configuration, a system may be employed that synchronizes with Sony's Smart Home® and combines with an Android®-based VR experience, e.g., Daydream® VR and Samsung Gear® VR, in order to save energy and alert the user of changes to their home environment. In this configuration, when commencing a VR session, VR integration software will synchronize with the Sony Smart Home® via a home automation system like, e.g., the Logitech Harmony Hub®, to perform certain functionality. This functionality includes implementing energy-saving measures controllable via the Sony Smart Home according to the user's preferred settings during an active VR session. Such energy-saving measures may include turning off or dimming lights, turning off or activating a sleep mode on certain devices. The user may further be alerted to key changes to their home environment, including phone calls, security risks, visitors at the door, and so on.

In an exemplary user flow, the user may put on the VR headset and commence a session. Environmental settings may automatically adjust to the user's preferences in the room/home. Should an event that warrants an alert occur during the experience, the experience may positively alert the user via a visual or audio prompt (or both). User preferences may also be employed to dictate what types of alerts are shared. Subsequent to the session, when the user removes the VR headset, environmental settings may automatically revert to default.

The above example configuration solves the problem that no solutions currently exist that cleanly bridge the gap between the VR experience and a user's environmental factors. Unified home environment management systems, like the Sony Smart Home, provide an opportunity to bridge this gap, helping the user easily automate energy-saving measures and ensuring their safety while using VR.

The above example configuration has the benefit that all of the devices operate on the Android platform, and thus such presents a clean integration solution. However, it will be understood that with appropriate modification of interfaces, cross platform integration may also be achieved. For example, any type of VR headset may be employed, including the Oculus Rift, the HTC Vive, the PS VR, Daydream VR, Gear VR, and so on. Other types of home automation systems may also be employed. In addition, the disclosed systems and methods may be applied to augmented reality systems, and indeed any display system in which user awareness of their environment is hampered.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ the headset accelerometer, a control device, a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file-storing medium. The outputs may be delivered to a user by way of a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purposes. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection (or a wired connection). The application may then be run by the user. Such a networked system may provide a suitable computing environment for an implementation in which a plurality of users provide separate inputs to the system and method. In the below system where a hub computing environment is employed along with a VR system for the delivery of notifications and the control of environmental parameters, the plural inputs may allow plural users to input relevant data at the same time.

While the invention herein disclosed is capable of obtaining the objects hereinbefore stated, it is to be understood that this disclosure is merely illustrative of the presently preferred embodiments of the invention and that no limitations are intended other than as described in the appended claims. For example, the invention can be used in a wide variety of settings, e.g., in the applications of gaming, computer-assisted medicine, education, and so on.

The invention claimed is:

1. A method of controlling a parameter of an environment, the environment one in which a display is employed by a user, the display such that user awareness of the environment is reduced, comprising:
   a. receiving a first signal at a hub computing environment indicating that a display is being used by a user, the display one in which user awareness of their environment is reduced, the display driven by a display computing environment, the hub computing environment coupled to at least one environmental control device; and
   b. in response to the received first signal, transmitting a second signal to the at least one environmental control device to cause a change to a parameter of the environment;
   wherein a combination of a category of the received first signal and a category of the transmitted second signal form a portion of an entry in a user profile; and
   wherein the category of the first signal is display usage and the category of the second signal is selected from the group consisting of: lighting, temperature, CE device, and combinations thereof.

2. The method of claim 1, wherein the environment control device is a thermostat, and the transmitting a second signal includes transmitting a signal to lower a set temperature on the thermostat.

3. The method of claim 1, wherein the environment control device is a light controller, and the transmitting a second signal includes transmitting a signal to lower a lighting level on the light controller.

4. The method of claim 1, wherein the environment control device is a device controller, and the transmitting a second signal includes transmitting a signal to the device controller to cause an associated device to be placed into a sleep or low power mode.

5. The method of claim 1, further comprising detecting whether another user is present in the environment, and wherein the transmitted second signal is further dependent on the result of the detecting.

6. The method of claim 1, further comprising detecting whether another user is participating in an application running on the display computing environment, and wherein the transmitted second signal is further dependent on the result of the detecting.

7. A non-transitory computer readable medium, comprising instructions for causing a computing environment to perform a method, the method comprising: receiving a first signal at a hub computing environment indicating that a display is being used by a user, the display one in which user awareness of their environment is reduced, the display driven by a display computing environment, the hub computing environment coupled to at least one environmental control device; and in response to the received first signal, transmitting a second signal to the at least one environmental control device to cause a change to a parameter of the environment;
   wherein a combination of a category of the received first signal and a category of the transmitted second signal form a portion of an entry in a user profile; and
   wherein the category of the first signal is display usage and the category of the second signal is selected from the group consisting of: lighting, temperature, CE device, and combinations thereof.

* * * * *